United States Patent
Inderst et al.

(10) Patent No.: US 11,315,126 B2
(45) Date of Patent: Apr. 26, 2022

(54) METHOD FOR VERIFYING THE VALIDITY OF A TICKET; MOBILE DEVICE

(71) Applicant: GIESECKE & DEVRIENT GMBH, Munich (DE)

(72) Inventors: Bernhard Inderst, Munich (DE); Ullrich Martini, Munich (DE); Dietmar Maierhöfer, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 569 days.

(21) Appl. No.: 15/525,219

(22) PCT Filed: Nov. 10, 2015

(86) PCT No.: PCT/EP2015/002260
§ 371 (c)(1),
(2) Date: May 8, 2017

(87) PCT Pub. No.: WO2016/074789
PCT Pub. Date: May 19, 2016

(65) Prior Publication Data
US 2017/0316423 A1  Nov. 2, 2017

(30) Foreign Application Priority Data
Nov. 10, 2014  (DE) .......................... 102014016606.6

(51) Int. Cl.
*G06Q 30/00* (2012.01)
*G07B 15/00* (2011.01)
(Continued)

(52) U.S. Cl.
CPC ......... *G06Q 30/018* (2013.01); *G06K 7/1417* (2013.01); *G06Q 10/02* (2013.01);
(Continued)

(58) Field of Classification Search
CPC .... G06Q 30/018; G06Q 10/02; G06K 7/1417; G07B 15/00; H04L 63/061;
(Continued)

(56) References Cited

U.S. PATENT DOCUMENTS

2002/0023027 A1   2/2002  Simonds
2002/0100803 A1*  8/2002  Sehr .................. G06Q 10/02
                                             235/384
(Continued)

FOREIGN PATENT DOCUMENTS

CN    101452583 A    6/2009
CN    101840521 A    9/2010
(Continued)

OTHER PUBLICATIONS

Wikipedia, "Digital signature," www.wikipedia.org, version of article dated Nov. 7, 2013, retrieved on Oct. 24, 2020.*
(Continued)

*Primary Examiner* — Nathan Erb
(74) *Attorney, Agent, or Firm* — Workman Nydegger

(57) ABSTRACT

A method for checking the validity of a ticket involves transferring information from a control entity to a mobile device. A code is computed on the basis of this information, of a derived key and of a property individual for the mobile device, the code being subsequently checked by the control entity.

14 Claims, 1 Drawing Sheet

(51) Int. Cl.
| | |
|---|---|
| *H04L 29/06* | (2006.01) |
| *H04W 12/04* | (2021.01) |
| *H04W 12/06* | (2021.01) |
| *G06K 7/14* | (2006.01) |
| *G06Q 10/02* | (2012.01) |
| *H04W 12/10* | (2021.01) |
| *H04W 12/77* | (2021.01) |

(52) U.S. Cl.
CPC ............ *G07B 15/00* (2013.01); *H04L 63/061* (2013.01); *H04L 63/0807* (2013.01); *H04L 63/0876* (2013.01); *H04W 12/04* (2013.01); *H04W 12/06* (2013.01); *H04L 63/12* (2013.01); *H04W 12/10* (2013.01); *H04W 12/77* (2021.01)

(58) Field of Classification Search
CPC . H04L 63/0807; H04L 63/0876; H04L 63/12; H04W 12/04; H04W 12/06; H04W 12/77; H04W 12/10
See application file for complete search history.

(56) References Cited

U.S. PATENT DOCUMENTS

| | | | | |
|---|---|---|---|---|
| 2004/0039919 | A1* | 2/2004 | Takayama | G06Q 20/04 713/180 |
| 2005/0033688 | A1* | 2/2005 | Peart | G06Q 20/04 705/39 |
| 2007/0150736 | A1* | 6/2007 | Cukier | H04W 12/0804 713/172 |
| 2009/0282256 | A1 | 11/2009 | Rakic et al. | |
| 2010/0228576 | A1* | 9/2010 | Marti | G06Q 10/02 705/5 |
| 2010/0332841 | A1 | 12/2010 | Watts et al. | |
| 2013/0090059 | A1* | 4/2013 | Edwards | G06Q 10/06 455/41.1 |
| 2015/0103734 | A1* | 4/2015 | Bobrek | H04L 47/6255 370/316 |
| 2015/0263855 | A1* | 9/2015 | Schulz | H04L 9/0827 713/155 |

FOREIGN PATENT DOCUMENTS

| | | |
|---|---|---|
| CN | 101866498 A | 10/2010 |
| CN | 103295270 A | 9/2013 |
| DE | 10347751 A1 | 5/2005 |
| DE | 102010017861 A1 | 10/2011 |

OTHER PUBLICATIONS

Wikipedia, "Public-key cryptography," www.wikipedia.org, version of article dated Nov. 1, 2013, retrieved on Oct. 24, 2020.*

Wikipedia, "Public key infrastructure," www.wikipedia.org, version of article dated Nov. 4, 2013, retrieved on Oct. 24, 2020.*

Luo, Ming, Huang, Donghua, and Hu, Jun, "An enhanced ECC remote mutual authentication with key agreement scheme for mobile devices," Journal of Software, Academy Publisher, 8.12: 3206(8), Dec. 2013.*

German Search Report for corresponding German Application No. 102014016606.6. dated Sep. 28, 2015.

International Search Report for corresponding International PCT Application No. PCT/EP2015/002260, dated Mar. 7, 2016.

Wikipedia, the free encyclopedia, "ID-Based Cryptography," Jul. 9, 2014, URL: https://en.wikipedia.org/w/index.php?title=ID-based_cryptography&oldid=616293331, downloaded Feb. 19, 2016.

Office Action from corresponding Chinese Application No. 201580060754.9, dated Sep. 10, 2019.

* cited by examiner

METHOD FOR VERIFYING THE VALIDITY OF A TICKET; MOBILE DEVICE

TECHNICAL FIELD

The present invention relates to a method for checking the validity of a ticket. Such methods are used for example in local public transport and/or in rail transport in order to check the validity of electronic tickets.

An electronic ticket is usually a ticket which is purchased by means of a mobile device, such as for example a mobile phone and/or a tablet PC. Alternatively, the ticket can also be purchased at the PC and subsequently transmitted to the mobile device. In contrast to the conventional ticket, which is printed out on paper and is conventionally supplied with additional security features, such as for example a hologram or the like, electronic tickets are represented on a display device of the mobile device. Contents that are represented on the display device of the mobile device are reproducible as desired, for which reason a ticket represented merely on the display device can be copied as many times as desired.

STATE OF THE ART

In order to make it more difficult to copy a ticket represented on the display device of the mobile device, currently a two-factor authentication method is used for example in trains of the Deutsche Bahn, in which an owner of the electronic ticket must always present said ticket in combination with a second factor. The second factor is, for example, an identification card of the user, a credit card of the user or a discount card of the user (BahnCard). Since the credit card and/or the discount card is a card that is unique and individual for the user, it can be ensured that only the owner of this card employs the electronically purchased ticket. Since it sometimes takes a very long time for the user to present not only the ticket, but also the credit card or discount card, ticket inspectors sometimes forgo a "proper" ticket inspection, limiting the check to a visual inspection of the ticket effected with the naked eye. Since electronic tickets are predominantly present in the form of so-called QR codes, these cannot be detected and verified with the naked eye.

In this respect, the prior art has the disadvantage that a proper inspection is not carried out due to the high time consumption of the inspection.

STATEMENT OF THE INVENTION

It is the object of the invention to make available a method for checking the validity of a ticket and a mobile device which is able to solve the problems of the state of the art and is further adapted to render the checking of an electronic ticket easier and more secure while maintaining high security standards.

The object is achieved by the subject matter of the independent claims. Preferred embodiments result from the dependent claims.

The invention is based on the fundamental idea that the mobile device receives an information item from a ticket inspector during the ticket inspection, processes said information off line, i.e. without online data connection, and makes a code available to the ticket inspector on the basis of said information, which enables the ticket inspector to check the validity of the ticket.

Accordingly, the process for checking the validity of an electronic ticket comprises transferring an information item, in particular a ticket-inspection-process initiation information, from a control entity, in particular a ticket checking device, to a mobile device; computing a code that is individual for the mobile device in the mobile device with the aid of the information, wherein in the mobile device a key is stored which is incorporated in the computation of the individual code, wherein the key is formed from a key stored on a server (master key) and at least one property that is individual for the mobile device; representing the code on the mobile device and/or transmitting the code from the mobile device to the control entity over an air interface, in particular on a display device and/or a contactless transmission device (BLE) of the mobile device; and the checking of the code by the control entity.

According to the invention the control entity is for example a ticket checking device as usually employed by ticket inspectors. Such a checking device can be a specially developed device and/or a mobile device such as for example a mobile phone. Alternatively, the control entity can be arranged at the entrance of a transport means, to check all passengers entering there. By transferring the ticket-checking-process initiation information it is communicated to the mobile device that a ticket check is to be effected.

A ticket-checking-process initiation information item is, for example, a challenge, in particular a random number. This ticket-checking-process initiation information can be transmitted contactlessly from the control entity to the mobile device for example via Bluetooth, in particular BLE, and/or by reading/photographing.

With the method according to the invention it is possible to ensure particularly advantageously that information from both the server and about properties individual for the mobile device are incorporated in the computation of the code individual for the mobile device. In this way it can be ensured with advantage that the mobile device which has purchased the electronic ticket or for which this electronic ticket was purchased, is also used in the check of the validity of the electronic ticket. If a different user with a different mobile device was checked, the computed code would be different, since not only the key is incorporated in the computation of the code, but also the properties individual for the mobile device. Accordingly it can be ensured with advantage that only the "right" mobile device is used in the check.

The representation of the code on the mobile device can be effected both visually, i.e. in optically perceivable manner, for example in the form of a code readable from the display device, and/or on a contactless transfer device, such as for example a BLE (Bluetooth Low Energy) or an NFC transfer device. The representation on the contactless transfer device has the advantage that the code can be immediately transmitted back to the control entity and represented there.

According to one embodiment, the transfer of the information from the control entity to the mobile device is effected by reading and/or by photographing the information from a display device of the control entity. Alternatively, according to a further embodiment, the transfer of the information from the control entity to the mobile device can be effected via a contactless information exchange, in particular over an air interface, for example by means of NFC, Bluetooth and/or WLAN. By means of these variants it is ensured that the transfer of information can be effected in a simple manner. Thus, for example the photographing of the information by means of the mobile device of the user is a common means already today to ascertain the information from a QR code, such as for example attached to an advertising poster. Alternatively, the user can also read the information from the control entity and input it manually on his mobile device, wherein a readable information item is a multi-digit number or the like. The contactless transfer of the information over an air interface represents a secure, fast and reliable transmission channel. In particular, the transfer via, for example, the NFC interface could be effected in accordance with a so-called tap-it method, in which two NFC-enabled devices approach each other for a short time in order to permit an exchange of information.

According to one embodiment, the information and/or the code is a machine-readable information item, preferably a QR code, particularly preferably an Aztec code, and/or a manually transferable information item, such as a multi-digit, in particular a four-digit, number. The multi-digit number is advantageous particularly when the information is read by the user, since it can be read and input on the mobile device quickly.

The mobile device can be a mobile phone, a tablet PC and/or a smart phone.

To ensure with advantage that the method according to the invention is also effected when mobile data are not available, the method is adapted such that the key is stored in the mobile device, preferably in a secure area, and is replaced only from time to time, i.e. at regular intervals, for example every few days and/or months, when a data connection is present. The key in the mobile device is generated in a server instance together with an individual property of the mobile device, for example the IMEI, the processor serial number and/or the MAC address of the mobile device, and the certificate is signed by a further key remaining in the server. When the key is generated, a PKI method is used among other things, in which the mobile device has a private key and the control entity has a public key.

Correspondingly, in accordance with one embodiment it is possible with advantage to carry out the individual code exclusively employing the data already present on the mobile device at the time of transfer of the information from the control entity to the mobile device. In other words, for computing the individual code no online data connection (in other words a data connection via the MNO) needs to be utilized, and the method can be executed with advantage also in regions where there is no or only a limited data connection. The transmission and/or transfer via Bluetooth, in particular BLE (Bluetooth Low Energy) is always possible.

According to one embodiment, the control entity is a ticket checking device. In this way it is ensured with advantage that ticket devices available already today can be used in a method according to the invention after a software update. Alternatively, the control entity can be a mobile phone and/or a smart phone.

According to a further particularly preferred embodiment, a ticket purchase at a ticket server is effected prior to transferring the information, wherein, after completing the purchase, a ticket information item, in particular a ticket form in the form of a machine-readable code, is transferred to the mobile device. In this way, the user is in possession of an electronic ticket, which he can present when required in an inspection. In this case, an inspection method could be performed as well in which the ticket is checked in the form of a machine-readable code in combination with an identity card or the like.

Accordingly, the ticket information can be incorporated additionally in the computation of the control code. Thus, the control entity can check with advantage whether the current ticket information is present on the mobile device. Subsequently, when the code is represented on the mobile device, this code can differ barely noticeably from the hitherto representable ticket prima facie. The user merely perceives the change of individual pixels and is thus aware that the computation of the new control code has been carried out. For an inspector this can likewise be an indication that his new code has been computed.

According to a further particularly preferred embodiment, the representation of the (control) code on the mobile device comprises the representation of the ticket information. In other words, the code and the ticket information can be processed to form one information item which is then represented on the display device of the mobile device, for example in the form of a single QR code. Alternatively, the ticket information and the code can be represented in the form of two separate information items on the display device of the mobile device. Of course, it is also possible to represent the code and the ticket information consecutively (in any order) on the display device, i.e. offset in time. The transmission of the code from the mobile device to the control entity over the air interface is understood equivalently to the concept of representing the code on the mobile device.

According to the invention, the property individual for the mobile device can be data which are protected in the mobile device against copying and/or unauthorized use. Consequently, the method is protected against unauthorized use.

The advantages of the invention are also apparent in a mobile device which is adapted to receive an information item from a control entity, wherein the mobile device is configured to compute, by means of a computing unit, a code that is individual for the mobile device, while employing the information, wherein the mobile device has a memory in which a key can be stored that is incorporated in the computation of the individual code, wherein the computation is effected by means of a computing unit (CPU), wherein the key is executed such that it is formed from a key stored on a server and from at least one property individual for the mobile device, and wherein the mobile device is configured to represent the code on a display device of the mobile device and/or to transmit the code from the mobile device to the control entity over an air interface. In the code, further features can be incorporated, such as for example a signature of the key of the server.

Accordingly, it is possible with the mobile device with advantage to take part in a ticket inspection in which the mobile device has to prove that it is in possession of the valid ticket. Additional authentication features, such as for example a credit card and/or a discount card, are not required. This reduces substantially the time required for an inspection of the ticket present on the mobile device. Consequently, ticket inspectors are more inclined to carry out a proper check of a ticket with the control entity, in particular with the ticket checking device.

The method according to the invention is particularly suitable for employment in a mobile device and/or in a control entity for checking electronic tickets or tickets for transport means.

DETAILED DESCRIPTION OF PREFERRED EMBODIMENTS OF THE INVENTION

In the following the invention will be described with reference to the FIGS. 1 and 2 by means of merely exemplary embodiments.

Figure 1:
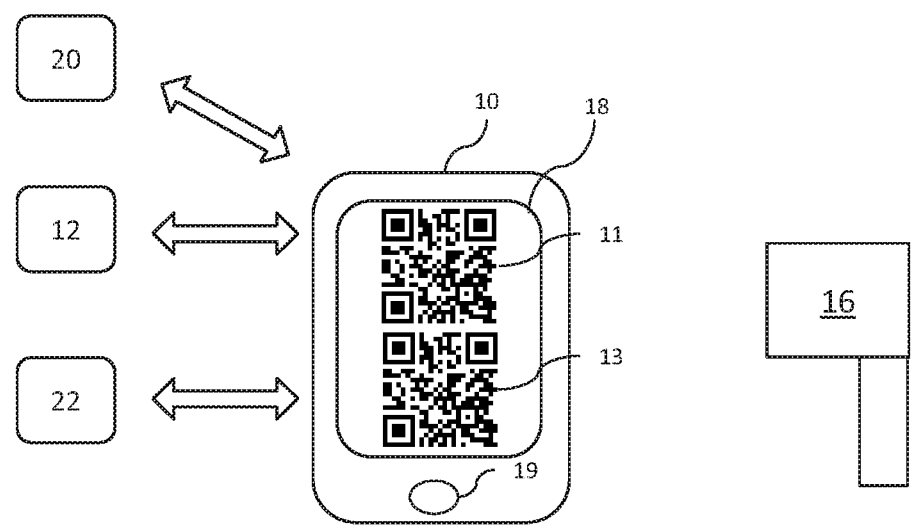
FIG. 1 shows a schematic representation of components that can be used in a method according to the invention.
Figure 2:
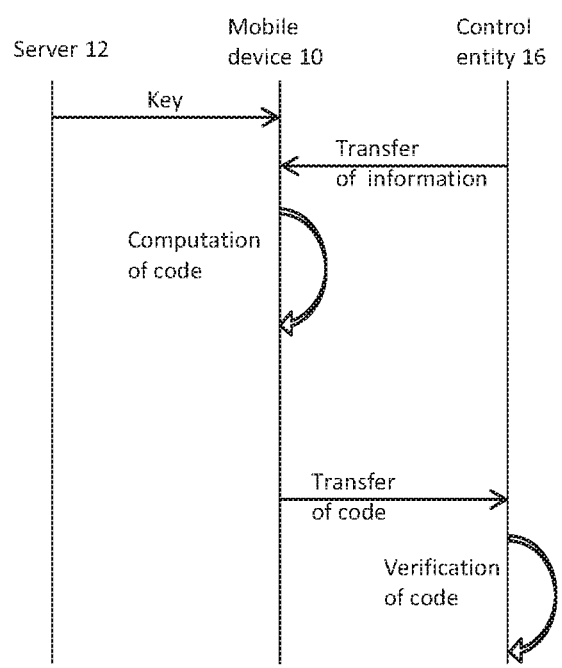
FIG. 2 shows the sequence of a method according to the invention.

FIG. 1 shows a mobile device 10. The mobile device can be a mobile communication device, a tablet PC and/or a smart phone, for example. The mobile device 10 is supplied with a display device 18, which can serve as input means simultaneously. The display device 18 can be configured as a touch-sensitive or capacitive display, for example. Further, the mobile device can be supplied with a multiplicity of tactile operation elements 19, as well as a camera device on the back side (not shown), wherein in FIG. 1 one operation element 19 is represented exemplarily.

Applications can be loaded on the mobile device. With the aid of applications, it is possible for a user of a mobile device to execute services on the mobile device. Applications can be employed to display, for example, news and/or the weather, applications can be employed for example to purchase tickets or tickets for transport means or access cards. These tickets can be employed to prove an access authorization in public transport means. So far, in public transport means tickets have been used that were printed on paper or the like, in order to prove that the passenger/user has paid for a ticket before boarding the transport means. However, lately electronic payment methods have increasingly become accepted, wherein the user buys the ticket electronically before boarding the transport means and shows said ticket in electronic form upon an inspection. In order avoid multiple copying of the ticket 11, the tickets are tied to a further authentication factor, such as for example a credit card, an identity card and/or a discount card of the user (two-factor authentication). If the user copied the ticket 11, he would also have to copy the discount card, the credit card and/or the identity card, which is not possible or is possible only with considerable effort.

However, this type of two-factor authentication has the disadvantage that a check of the ticket 11 by means of a control device 16 takes considerable time, since not only the ticket 11 has to be read, but also the credit card or discount card. Consequently, depending on the time available, inspectors/conductors are not able to inspect all electronic tickets "properly", limiting themselves to a quick glance at the QR code.

This is where the invention comes to bear. According to the invention, the user first buys a ticket 11 by means of his mobile device 10. To simplify the buying process, he can download a suitable application from an app store 20 for this purpose. Alternatively, the user can also buy the ticket via a browser interface of the provider or he can buy the ticket at home and subsequently send it to his mobile device 10, for example by email or MMS, or download the ticket with his mobile device 10.

According to the invention it is provided that a key is stored in the mobile device 10, preferably in a secure memory area (secure element) or a secure software container of the mobile device. This key is transmitted from a server 12 to the mobile device 10, wherein the key transmitted to the mobile device 10 is a derived key. The derived key is derived from the key stored on the server 12 in a secure environment (master key), wherein a property individual for the mobile device 10 is incorporated in the key. The derived key stored in the mobile device 10 is updated at regular intervals, for example hourly, daily, weekly and/or monthly.

During an inspection of the ticket 11, a (ticket) inspector transfers an information item to the mobile device by means of a control entity 16, in particular with his ticket checking device. The information can be transferred manually, for example. Therein, the inspector shows the user a multi-digit number that is represented on the control entity 16 and the user of the mobile device 10 inputs this information on the display device 18 of the mobile device. Alternatively, the user can read and process a QR code represented on the display device of the control entity 16 by means of a camera device of the mobile device 10. Alternatively, the information can be transmitted over the air interface, in particular via WLAN, Bluetooth and/or NFC, from the control entity 16 to the mobile device 10. In case of a transmission via NFC (according to ISO 14443) it is required to establish a relatively short distance (<10 cm) between the mobile device 10 and the control entity 16 for a short period of time.

As soon as the mobile device 10 has received the information from the control entity 16, the mobile device 10 computes an individual code 13 in the mobile device. The transferred information, the derived key stored in the mobile device and an individual property of the mobile device are incorporated in the computation of the individual code 13. The individual property of the mobile device 10 can already be present in the derived key and be introduced by the server 12. In other words, the IMEI is regarded as an individual property of the mobile device, for example. The IMEI (international mobile station equipment identity) is a number which is unique for each mobile device 10. Consequently, it can be ensured that the code 13 is tailored individually to the mobile device 10, the derived key and the information transferred by the control entity 16. Since both the derived key and the information transferred by the control entity 16 change at regular intervals, it can be ensured that counterfeiting of the ticket is rendered nearly impossible.

The computation of the individual code 13 is effected by means of a computing device (CPU) of the mobile device 10. The computed code 13 can be stored subsequently in a memory, in particular in a secure storage area (secure element), of the mobile device 10. For the computation of the code 13 it is not required that the mobile device 10 is connected to the server 12 via an online data connection. This is advantageous when the inspection takes place in locations with insufficient data connection.

After the computation of the code 13, said code is represented on the display device 18 of the mobile device 10. In the embodiment example shown in FIG. 1, the ticket 11 bought from the ticket server 22 and the code 13 are represented in an arrangement of one above the other. Alternatively, the code 13 could also comprise the ticket information 11, so that merely the representation of a QR code 13 is effected on the display device 18. Further, it would also be possible to represent the ticket information 11 and the 13 code offset in time on the display device 18, wherein it is possible in addition that the representation of the ticket information 11 of the code 13 is effected alternately at intervals of time.

As soon as the code 13 is represented on the display device 18, the control entity 16 can read out the code 13 (and possibly also the ticket information 11) by means of a camera device or a scanner device (for example a laser scanner). The control entity 16 checks whether the code 13 was formed employing the information ascertained by the control entity 16, the current, derived key, and the property individual for the mobile device 10. If this is true, it can be safely determined that a valid ticket information item 11 for this mobile device 10 is given.

The process just described can be carried out in a very short time (less than 10 seconds) and does not require presentation of a second object (for example the credit card). Thereby, the method can be carried out very quickly.

Alternatively or additionally, it is possible, as already stated above, that the representation of the code 13 is effected on a wireless transmission device of the mobile device 10. The wireless transmission device can be a Bluetooth module, an NFC module and/or a WLAN module. With this wireless transmission device it is possible to transmit the code to the control entity 16 over an air interface in wireless manner. In the control entity it can be checked whether the ticket and the computed code 13 are valid, i.e. whether the computation has been carried out correctly. This procedure has the advantage that it takes place completely in the background and the user does not need to present the mobile device 10 to the inspector for reading an optical code 13 by means of the control entity 16.

FIG. 2 shows again by means of a diagram how the derived key is transmitted from the server 12 to the mobile device 10. The derived key can be transmitted from the control entity 16 to the mobile device 10 before and/or after transferring the information. It is merely required that the current, derived key is present in the mobile device 10 at the time of computation of the code. However, it is preferred to transmit the derived key in advance, so that the complete check of the validity of the ticket 11 can be carried out "off line", i.e. without an existing or active data connection.

The method according to the invention further has the advantage that in a transition phase, the control device 16 can be configured so that it can check tickets both according to the hitherto procedure (two-factor authentication) and to the method according to the invention. Further, it is not required to convert the hardware of the control entity 16. Merely the software of the control entity 16 would have to be adjusted.

In FIG. 1, the ticket server, from which the ticket information or the ticket 11 is purchased, and the server 12, on which the key is stored, are represented as two separate units. It need not be mentioned that the server 12 and the ticket server 22 could also be represented as one unit. In the derivation of the key by means of the server 12 known PKI methods can be used. The control entity 16 must have a public key for checking or verifying the code.

The invention claimed is:

1. A method for checking the validity of a ticket, having the following steps of:
   forming a key from a key stored on a server and a property individual to the mobile device, and storing the formed key in a mobile device;
   transferring an information item, in particular a ticket-checking-process initiation information item from a control entity to the mobile device;
   computing a code individual for the mobile device in the mobile device, employing the information, wherein the formed key is incorporated in the computation of the individual code;
   representing the code on the mobile device and/or transmitting the code from the mobile device to the control entity over an air interface;
   checking the code by the control entity, the control entity provided with the formed key from the server;
   wherein the server is distinct from the control entity.

2. The method according to claim 1, wherein the transfer of the information is effected by reading and/or by photographing the information from a display device of the control entity.

3. The method according to claim 1, wherein the transfer of the information is effected via a contactless information exchange, in particular over an air interface.

4. The method according to claim 1, wherein the information and/or the code is a machine-readable information item, and/or a manually transferable information item and/or code.

5. The method according to claim 1, wherein the mobile device is a mobile phone, a tablet PC and/or a smart phone.

6. The method according to claim 1, wherein the computation of the individual code is effected without requiring a mobile data connection.

7. The method according to claim 1, wherein the computation of the individual code is effected exclusively employing the data already present on the mobile device at the time of the transfer of the information from the control entity to the mobile device.

8. The method according to claim 1, wherein the control entity is a ticket checking device.

9. The method according to claim 1, wherein before the transfer of the information a ticket purchase from a ticket server is effected; and wherein, after completion of the purchase, a ticket information item in the form of a machine-readable code is transferred to the mobile device.

10. The method according to claim 1, wherein the ticket information is incorporated additionally in the computation of the control code.

11. The method according to claim 1, wherein the representation of the code on the mobile device comprises the representation of the ticket information.

12. The method according to claim 1, wherein the property individual for the mobile device is an information item from at least one of an IMEI, a processor serial number and/or the MAC address of the mobile device.

13. The method according to claim 1, wherein the property individual for the mobile device is data which are protected in the mobile device against copying and/or unauthorized use.

14. A mobile device comprising:
   a computing unit configured to compute a code that is individual for the mobile device;
   a memory in which a key formed from a key stored on a server and a property individual to the mobile device is stored, a control entity being provided with the formed key from the server; and
   a display device configured to represent the individual code thereon, for communicating to the control entity for checking the individual code;
   wherein the mobile device is adapted to receive an information item from the control entity and employ the information item in computing the individual code;
   wherein the formed key stored in the memory is incorporated in the computation of the individual code; and
   wherein the server is distinct from the control entity.

* * * * *